(12) United States Patent
Rojahn

(10) Patent No.: US 9,053,180 B2
(45) Date of Patent: *Jun. 9, 2015

(54) IDENTIFYING COMMON DATA OBJECTS REPRESENTING SOLUTIONS TO A PROBLEM IN DIFFERENT DISCIPLINES

(71) Applicant: International Business Machines Corporation, Armonk, NY (US)

(72) Inventor: Tom O. Rojahn, Oslo (NO)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/301,413

(22) Filed: Jun. 11, 2014

(65) Prior Publication Data

US 2014/0330871 A1 Nov. 6, 2014

Related U.S. Application Data

(63) Continuation of application No. 12/916,456, filed on Oct. 29, 2010, now Pat. No. 8,793,208.

(30) Foreign Application Priority Data

Dec. 17, 2009 (EP) ..................... 09179665

(51) Int. Cl.
   - *G06N 5/02* (2006.01)
   - *G06F 17/30* (2006.01)
   - *G06N 5/04* (2006.01)

(52) U.S. Cl.
   CPC ............ *G06F 17/30734* (2013.01); *G06N 5/04* (2013.01)

(58) Field of Classification Search
   None
   See application file for complete search history.

(56) References Cited

U.S. PATENT DOCUMENTS

| 6,092,099 A | 7/2000 | Irie et al. |
| 6,167,370 A | 12/2000 | Tsourikov et al. |

(Continued)

FOREIGN PATENT DOCUMENTS

| EP | 1596313 | 6/2006 |
| WO | 0115042 | 3/2001 |

(Continued)

OTHER PUBLICATIONS

Halpin; Ontological Modeling; May 17, 2011; www.orm.net (From Internet Wayback Machine); retrieved from the Internet Sep. 20, 2013; 51 pages. (as in PTO892 in connection with Non-Final Office Action dated Sep. 26, 2013—U.S. Appl. No. 13/432,120).

(Continued)

*Primary Examiner* — Kakali Chaki
*Assistant Examiner* — Mai T Tran
(74) *Attorney, Agent, or Firm* — Schmeiser, Olsen & Watts; John Pivnichny

(57) ABSTRACT

An approach is provided for identifying a solution to a problem where the problem and solution are in different disciplines. First data elements in common between first and second ontologies are determined and second data elements in common between first and third ontologies are determined. Based on the number of first data elements exceeding a threshold value and the number of second data elements not exceeding the threshold value, a bridged ontology is generated that merges the first and second ontologies but not the first and third ontologies. A relationship is identified between a subject, predicate and object extracted from a first data object which specifies the problem and, respectively, a subject, predicate, and object of a second data object included in the bridged ontology. Based on the relationship, the solution is identified as being the second data object.

20 Claims, 8 Drawing Sheets

(56) References Cited

U.S. PATENT DOCUMENTS

| | | |
|---|---|---|
| 6,487,545 B1 | 11/2002 | Wical |
| 7,027,974 B1 | 4/2006 | Busch et al. |
| 7,228,302 B2 | 6/2007 | Kuchinsky et al. |
| 7,284,196 B2 | 10/2007 | Skeen et al. |
| 7,308,458 B2 | 12/2007 | Vincent, III |
| 7,401,087 B2 | 7/2008 | Copperman et al. |
| 7,433,876 B2 | 10/2008 | Spivack et al. |
| 7,493,333 B2 | 2/2009 | Hill et al. |
| 7,496,593 B2 | 2/2009 | Gardner et al. |
| 7,558,791 B2 | 7/2009 | Wahl |
| 7,743,078 B2 | 6/2010 | Azvine et al. |
| 7,890,518 B2 | 2/2011 | Aasman |
| 7,912,701 B1 | 3/2011 | Gray et al. |
| 7,966,305 B2 | 6/2011 | Olsen |
| 8,041,746 B2 | 10/2011 | Stuhec |
| 8,060,519 B2 | 11/2011 | Hosokawa |
| 8,078,647 B2 | 12/2011 | Liang et al. |
| 8,219,540 B2 | 7/2012 | Carter et al. |
| 8,352,403 B2 | 1/2013 | Lee et al. |
| 8,478,766 B1 | 7/2013 | Tsypliaev et al. |
| 8,528,018 B2 | 9/2013 | Patil et al. |
| 8,539,001 B1 | 9/2013 | Haim et al. |
| 8,747,115 B2 | 6/2014 | Lorge et al. |
| 8,793,208 B2 | 7/2014 | Rojahn |
| 8,799,330 B2 | 8/2014 | Haim et al. |
| 2003/0018616 A1 | 1/2003 | Wilbanks et al. |
| 2003/0074516 A1 | 4/2003 | Cho et al. |
| 2004/0010491 A1 | 1/2004 | Riedinger |
| 2004/0093331 A1 | 5/2004 | Garner et al. |
| 2005/0027681 A1 | 2/2005 | Bernstein et al. |
| 2005/0131920 A1 | 6/2005 | Rust et al. |
| 2005/0154723 A1 | 7/2005 | Liang |
| 2005/0228981 A1 | 10/2005 | Gavrilov et al. |
| 2006/0031757 A9 | 2/2006 | Vincent, III |
| 2006/0053098 A1 | 3/2006 | Gardner et al. |
| 2006/0053099 A1 | 3/2006 | Gardner et al. |
| 2006/0053151 A1 | 3/2006 | Gardner et al. |
| 2006/0053171 A1 | 3/2006 | Eldridge et al. |
| 2006/0053172 A1 | 3/2006 | Gardner et al. |
| 2006/0053174 A1 | 3/2006 | Gardner et al. |
| 2006/0053175 A1 | 3/2006 | Gardner et al. |
| 2006/0074832 A1 | 4/2006 | Gardner et al. |
| 2006/0074980 A1 | 4/2006 | Sarkar |
| 2007/0016563 A1 | 1/2007 | Omoigui |
| 2007/0179971 A1 | 8/2007 | Benson |
| 2007/0226203 A1 | 9/2007 | Adya et al. |
| 2008/0016036 A1 | 1/2008 | Omoigui |
| 2008/0021912 A1 | 1/2008 | Seligman et al. |
| 2008/0040308 A1 | 2/2008 | Ranganathan et al. |
| 2008/0091634 A1 | 4/2008 | Seeman |
| 2008/0091727 A1 | 4/2008 | Wynett et al. |
| 2008/0162498 A1 | 7/2008 | Omoigui |
| 2008/0189269 A1 | 8/2008 | Olsen |
| 2008/0195570 A1 | 8/2008 | Alsafadi et al. |
| 2008/0288456 A1 | 11/2008 | Omoigui |
| 2008/0294644 A1 | 11/2008 | Liu et al. |
| 2008/0313229 A1 | 12/2008 | Taswell |
| 2009/0048907 A1 | 2/2009 | Lieberman |
| 2009/0077094 A1 | 3/2009 | Bodain |
| 2009/0112903 A1 | 4/2009 | Liang et al. |
| 2009/0254572 A1 | 10/2009 | Redlich et al. |
| 2010/0036788 A1 | 2/2010 | Wu et al. |
| 2010/0115436 A1 | 5/2010 | Embley et al. |
| 2010/0121885 A1 | 5/2010 | Hosomi et al. |
| 2010/0131516 A1 | 5/2010 | Jean-Mary |
| 2010/0217784 A1 | 8/2010 | Carter et al. |
| 2011/0040717 A1 | 2/2011 | Rho et al. |
| 2011/0093467 A1 | 4/2011 | Sharp et al. |
| 2011/0113095 A1 | 5/2011 | Hatami-Hanza |
| 2011/0153539 A1 | 6/2011 | Rojahn |
| 2011/0238610 A1 | 9/2011 | Lee et al. |
| 2012/0173493 A1 | 7/2012 | Sabbouh |
| 2012/0239677 A1 | 9/2012 | Neale |
| 2013/0091119 A1 | 4/2013 | Huang et al. |
| 2013/0166303 A1 | 6/2013 | Chang et al. |
| 2013/0260358 A1 | 10/2013 | Lorge et al. |
| 2014/0052759 A1 | 2/2014 | Haim et al. |
| 2014/0237000 A1 | 8/2014 | Lorge et al. |

FOREIGN PATENT DOCUMENTS

| | | |
|---|---|---|
| WO | 0221259 | 3/2002 |
| WO | 0235376 | 5/2002 |
| WO | 03042872 | 5/2003 |

OTHER PUBLICATIONS

Peroni, et al.; Identifying key concepts in an ontology through the integration of cognitive principles with statistical and topological measures; 2009 (From Internet Wayback Machine URL: web.archive.org/web/20090615000000*/ http:1/people.k mi.open.a c.u k/motta/.../key_c oncepts_aswc.pdf); Retrieved from the Internet Sep. 21, 2013; 16 pages (as in PTO892 in connection with Non-Final Office Action dated Sep. 26, 2013; U.S. Appl. No. 13/432,120).

Shvaiko et al.; A Survey of Schema-based Matching Approaches; Journal on Data Semantics IV; vol. 3730; 2005; 26 pages.

Euzenat et al.; An integrative proximity measure for ontology alignment; Proceedings of the Semantic Integration workshop at the International Semantic Web Conference (ISWC); 2003; 6 pages.

Hu et al.; Discovering Simple Mappings Between Relational Database Schemas and Ontologies; In Proceedings of ISWC/ASWC2007; 2007; 14 pages.

Raghavan et al.; Schema Mapper: A Visualization Tool for DL Integration; JCDL '05; Jun. 7-11, 2005; p. 414.

Mir et al.; An Unsupervised Approach for Acquiring Ontologies and RDF Data from Online Life Science Databases; Lecture Notes in Computer Science; vol. 6089; Springer-Verlag Berlin Heidelberg 2010; The Semantic Web: Research and Applications, 7th Extended Semantic Web Conference; ESWC 2010; Heraklion, Crete, Greece, May 30-Jun. 3, 2010; Proceedings, Part II; 15 pages.

Hayes et al.; A Collaborative Development Environment for Ontologies (CODE); Semantic Integration Workshop (ISWC); Oct. 2003; 5 pages.

Balakrishna et al.; Automatic Ontology Creation from Text for National Intelligence Priorities Framework (NIPF); Proceedings of 3rd International Ontology for the Intelligence Community (OIC) Conference, 5 pages; Dec. 3-4, 2008.

Petersen, Ulrik; Automatic Lexicon-based Ontology-creation, A methodological study; Master's Thesis research paper; Aalborg University; Jan. 6, 2003; 47 pages.

Volkel et al., Semversion: An RDF-Based Ontology Versioning System, IADIS International Conference WWW/Internet 2006, pp. 195-202.

Ostrovsky et al., Efficiently Merging Graph Nodes With Application to Cluster Analysis, Apr. 20, 2007, 13 pages.

International Search Report and Written Opinion (Mail Date Jun. 11, 2013); International Application No. PCT/IB2013/051823; Filing Date Mar. 7, 2013; 8 pages.

Morita et al.; Information Integration with Linked Data; Journal of the Japanese Society for Artificial Intelligence; vol. 27, No. 2; Mar. 1, 2012; pp. 189-199.

Nakayama et al.; A Method based on NLP with Link Structure Mining to Construct a Web Ontology for Wikipedia; The Institute of Electronics, Information nad Communication Engineers; the Journal of 19th Data Engineering Workshop; Apr. 7, 2008; pp. 1-6.

Tamagawa et al.; Learning a Large Scale of Ontology from Japanese Wikipedia, Transaction of the Japanese Society for Artificial Intelligence; vol. 25 (2010), No. 5; The Japanese Society for Artificial Intelligence; Aug. 17, 2010; pp. 623-636 [retrieved from the Internet Jun. 3, 2013] ,URL https://www.jstage.jst.go.jp/article/tjsai/25/5/25_5_623/_article/-char/ja/>.

Appendix P; List of IBM Patents or Patent Applications Treated as Related; attached Jun. 10, 2014; 1 page.

Notice of Allowance (Mail Date Jan. 27, 2014) for U.S. Appl. No. 13/432,120, filed Mar. 28, 2012.

Notice of Allowance (Mail Date Mar. 20, 2014) for U.S. Appl. No. 13/957,550, filed Aug. 2, 2013.

(56) References Cited

OTHER PUBLICATIONS

Amendment filed Dec. 24, 2013 in response to Office Action (Mail Date Sep. 26, 2013) for U.S. Appl. No. 13/432,120, filed Mar. 28, 2012.
Office Action (Mail Date Sep. 26, 2013) for U.S. Appl. No. 13/432,120, filed Mar. 28, 2012.
U.S. Appl. No. 13/957,550, filed Aug. 2, 2013.
U.S. Appl. No. 13/589,614, filed Aug. 20, 2012.
U.S. Appl. No. 12/916,456, filed Oct. 29, 2010.
Office Action (Mail Date Oct. 25, 2013) for U.S. Appl. No. 12/916,456, filed Oct. 29, 2010.
Amendment filed Feb. 3, 2014 in response to Office Action (Mail Date Oct. 25, 2013) for U.S. Appl. No. 12/916,456, filed Oct. 29, 2010.
Notice of Allowance (Mail Date Mar. 7, 2014) for U.S. Appl. No. 12/916,456, filed Oct. 29, 2010.
Notice of Allowance (Mail Date May 8, 2013) for U.S. Appl. No. 13/589,614, filed Aug. 20, 2012.
U.S. Appl. No. 13/432,120, filed Mar. 28, 2012.
U.S. Appl. No. 14/262,191, filed Apr. 25, 2014.
Notice of Allowance (Mail Date May 13, 2014) for U.S. Appl. No. 13/432,120, filed Mar. 28, 2012.
Amendment filed Dec. 8, 2014 in response to Office Action (Mail Date Aug. 7, 2014) for U.S. Appl. No. 14/262,191, filed Apr. 25, 2014.
Office Action (Mail Date Aug. 7, 2014) for U.S. Appl. No. 14/262,191, filed Apr. 25, 2014.
Final Office Action (Mail Date Dec. 22, 2014) for U.S. Appl. No. 14/262,191, filed Apr. 25, 2014.

IDENTIFYING COMMON DATA OBJECTS REPRESENTING SOLUTIONS TO A PROBLEM IN DIFFERENT DISCIPLINES

This application is a continuation application claiming priority to Ser. No. 12/916,456 filed Oct. 29, 2010, now U.S. Pat. No. 8,793,208 issued Jul. 29, 2014.

BACKGROUND

Embodiments of the disclosure relate generally to semantic searching, and more particularly, to identifying data objects representing a problem and solutions to the problem in different disciplines.

Research and development teams often need to solve problems in order to deliver innovative products and services to customers. Although it is possible to use search engines to search through a large amount of data to find a solution to a particular problem, such as using the Web, it is not possible to type into a search bar a description of a particular problem and for a search engine to find a solution to that problem. The reason being that key words used to define the problem often imply a limitation on a specific domain area, or a discipline, in which the problem is to be searched.

It is generally difficult to effectively identify a problem and generalize it into a problem statement. It is vital that the scope the problem statement is not specified too broadly or too narrowly in order to obtain a meaningful set of relevant results. Further, it is recognized that innovation often takes place at the intersection between two or more different disciplines. For example, car designers may have in common the quest to identify optimal shapes for cars. An optimal car shape is one which produces the minimum amount of turbulence and requires less energy to travel. Further, the optimal design must also have an appearance that is attractive to the consumers.

At the same time, a marine biologist who has studied various life forms in the sea may well understood how life forms have adapted to underwater conditions, such as the swimming of fish. The similar conditions in which fish swim may apply to the design of a car. For example, boxfish is known to have evolved its shape so that it requires less energy for the boxfish to move in the water. The evolved shape of the boxfish produces the minimum amount of drag in the water and has a low drag co-efficient, which is comparable to that of stream-lined airfoils in an aircraft.

There is thus a need for mechanisms to identify solutions to a particular problem based on disciplines different from the discipline of the problem.

BRIEF SUMMARY OF THE DISCLOSURE

Exemplary embodiments of the disclosure relate to identifying a solution to a problem where the solution and problem are in different disciplines, based on semantic searching of a bridged ontology related to the disciplines. The exemplary embodiments of the disclosure may be used for data search, collaboration databases, and data analytic systems and applications.

In a first embodiment, the present invention provides a computer system including a central processing unit (CPU); a memory coupled to the CPU; and a computer-readable storage device coupled to the CPU. The storage device includes instructions that are executed by the CPU via the memory to implement a method for identifying a solution to a problem, where the problem and the solution are in different first and second disciplines respectively represented by first and second ontologies. The method includes in response to a determination that the first ontology represents the first discipline of the problem, the computer system retrieving the first ontology from a plurality of ontologies stored in a data store. The method further includes the computer system selecting the second ontology and a third ontology from the plurality of ontologies. The method further includes based on the second ontology being selected and in response to traversals of first and second directed graphs representing the first and second ontologies, respectively, the computer system determining a first number of first data elements in common between the first directed graph and the second directed graph. The first data elements in common are data elements in the first directed graph whose words and properties are identical to respective words and properties in data elements in the second directed graph. The method further includes based on the third ontology being selected and in response to traversals of a third directed graph representing the third ontology and the first directed graph, the computer system determining a second number of second data elements in common between the first directed graph and the third directed graph. The second data elements in common are data elements in the first directed graph whose words and properties are identical to respective words and properties in data elements in the third directed graph. The method further includes the computer system determining the first number of first data elements exceeds a threshold value and determining the second number of second data elements does not exceed the threshold value. The method further includes based on the first number of the first data elements in common between the first directed graph and the second directed graph exceeding the threshold value, and the second number of the second data elements in common between the first directed graph and the third directed graph not exceeding the threshold value, the computer system generating a bridged ontology that merges the first and second ontologies, but does not merge the first and third ontologies. The method further includes the computer system extracting a subject, predicate, and object of the problem from a first data object which specifies the problem. The first data object is based on a determination of key words in a statement of the problem. The method further includes the computer system identifying a relationship between the extracted subject, predicate, and object and, respectively, a subject, predicate, and object of a second data object included in the bridged ontology. The method further includes based on the identified relationship between the subject, predicate, and object extracted from the first data object which specifies the problem and, respectively, the subject, predicate, and object of the second data object included in the bridged ontology, the computer system identifying the solution to the problem as being the second data object.

In a second embodiment, the present invention provides a method for identifying a solution to a problem, where the problem and the solution are in different first and second disciplines respectively represented by first and second ontologies. The method includes in response to a determination that the first ontology represents the first discipline of the problem, a computer retrieving the first ontology from a plurality of ontologies stored in a data store. The method further includes the computer selecting the second ontology and a third ontology from the plurality of ontologies. The method further includes based on the second ontology being selected and in response to traversals of first and second directed graphs representing the first and second ontologies, respectively, the computer determining a first number of first data elements in common between the first directed graph and the second directed graph. The first data elements in common are data elements in the first directed graph whose words and properties are identical to respective words and properties in data elements in the second directed graph. The method further includes based on the third ontology being selected and in response to traversals of a third directed graph representing the third ontology and the first directed graph, the computer determining a second number of second data elements in common between the first directed graph and the third directed graph. The second data elements in common are data elements in the first directed graph whose words and properties are identical to respective words and properties in data elements in the third directed graph. The method further includes the computer determining the first number of first data elements exceeds a threshold value and determining the second number of second data elements does not exceed the threshold value. The method further includes based on the first number of the first data elements in common between the first directed graph and the second directed graph exceeding the threshold value, and the second number of the second data elements in common between the first directed graph and the third directed graph not exceeding the threshold value, the computer generating a bridged ontology that merges the first and second ontologies, but does not merge the first and third ontologies. The method further includes the computer extracting a subject, predicate, and object of the problem from a first data object which specifies the problem. The first data object is based on a determination of key words in a statement of the problem. The method further includes the computer identifying a relationship between the extracted subject, predicate, and object and, respectively, a subject, predicate, and object of a second data object included in the bridged ontology. The method further includes based on the identified relationship between the subject, predicate, and object extracted from the first data object which specifies the problem and, respectively, the subject, predicate, and object of the second data object included in the bridged ontology, the computer identifying the solution to the problem as being the second data object.

In a third embodiment, the present invention provides a computer program product including a computer-readable storage device and a computer-readable program code stored in the computer-readable storage device. The computer-readable program code includes instructions that are executed by a central processing unit (CPU) of a computer system to implement a method for identifying a solution to a problem where the problem and the solution are in different disciplines respectively represented by first and second ontologies. The method includes in response to a determination that the first ontology represents the first discipline of the problem, the computer system retrieving the first ontology from a plurality of ontologies stored in a data store. The method further includes the computer system selecting the second ontology and a third ontology from the plurality of ontologies. The method further includes based on the second ontology being selected and in response to traversals of first and second directed graphs representing the first and second ontologies, respectively, the computer system determining a first number of first data elements in common between the first directed graph and the second directed graph. The first data elements in common are data elements in the first directed graph whose words and properties are identical to respective words and properties in data elements in the second directed graph. The method further includes based on the third ontology being selected and in response to traversals of a third directed graph representing the third ontology and the first directed graph, the computer system determining a second number of second data elements in common between the first directed graph and the third directed graph. The second data elements in common are data elements in the first directed graph whose words and properties are identical to respective words and properties in data elements in the third directed graph. The method further includes the computer system determining the first number of first data elements exceeds a threshold value and determining the second number of second data elements does not exceed the threshold value. The method further includes based on the first number of the first data elements in common between the first directed graph and the second directed graph exceeding the threshold value, and the second number of the second data elements in common between the first directed graph and the third directed graph not exceeding the threshold value, the computer system generating a bridged ontology that merges the first and second ontologies, but does not merge the first and third ontologies. The method further includes the computer system extracting a subject, predicate, and object of the problem from a first data object which specifies the problem. The first data object is based on a determination of key words in a statement of the problem. The method further includes the computer system identifying a relationship between the extracted subject, predicate, and object and, respectively, a subject, predicate, and object of a second data object included in the bridged ontology. The method further includes based on the identified relationship between the subject, predicate, and object extracted from the first data object which specifies the problem and, respectively, the subject, predicate, and object of the second data object included in the bridged ontology, the computer system identifying the solution to the problem as being the second data object.

The details of the embodiments of the disclosure, both as to their structure and operation, are described below in the Detailed Description section in reference to the accompanying drawings. The Summary is intended to identify key features of the claimed subject matter, but it is not intended to be used to limit the scope of the claimed subject matter.

DETAILED DESCRIPTION OF THE DISCLOSURE

The disclosure relates to identifying solutions to a problem in different disciplines based on a bridged ontology created from common data elements and relationships of the ontologies representing the disciplines different from the discipline of the problem.

Figure 1:
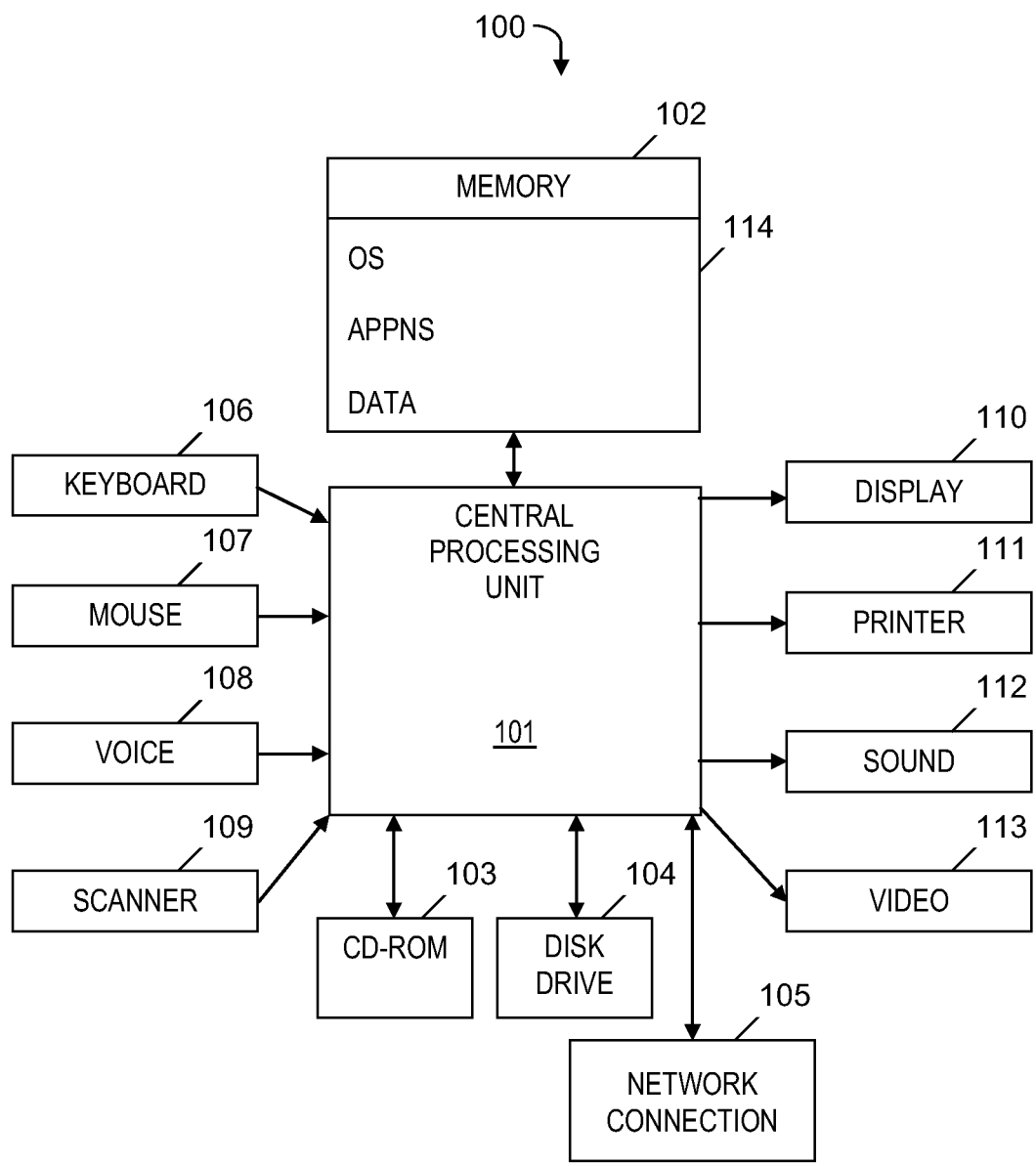
FIG. 1 illustrates a schematic diagram of a data processing system in which aspects of the disclosure may be implemented, according to an embodiment of the invention.

Referring now to the drawings and in particular to FIG. 1, there is illustrated a representative data processing system in which aspects of the disclosure may be provided. Data processing system 100 comprises a central processing unit 101 and primary storage 102. Primary storage 102 may be RAM or ROM which stores program information 114 and data acted on or created by application programs. The program information 114 may include operating system code for the data processing system 100 and application code for applications running on the computer system 100. Secondary storage of the system 100 may include optical disk storage 103 and magnetic disk storage 104. Data and program information can also be stored and accessed from secondary storage.

The data processing system 100 may have a network connection module 105 for interfacing the data processing system 100 to a computer network. The data processing system 100 may also have other external communication interfaces such as a modem or telephone connection. The central processing unit 101 comprises input means in the form of, for example, a keyboard 106, a mouse 107, voice input 108, and a scanner 109 for inputting text, images, graphics or the like. Output means from the central processing unit 101 may include a display 110, a printer 111, sound device 112, video device 113, etc. Applications may run on the data processing system 100 from a storage 102 or via a networked storage system that is connected to network 105.

In an exemplary embodiment of the disclosure, application code may comprise an analytics engine for constructing data objects. Each data object may include one or more data elements of certain properties and attributes, whereas a combination of the data elements may characterize a problem definition or a solution definition in a particular domain or discipline. The analytic engine may include a semantic search component for bridging two or more ontologies and using the bridged ontology to identify relationships between data elements of the data object associated with a problem definition and the data elements of the data object associated with a solution definition.

Figure 2:
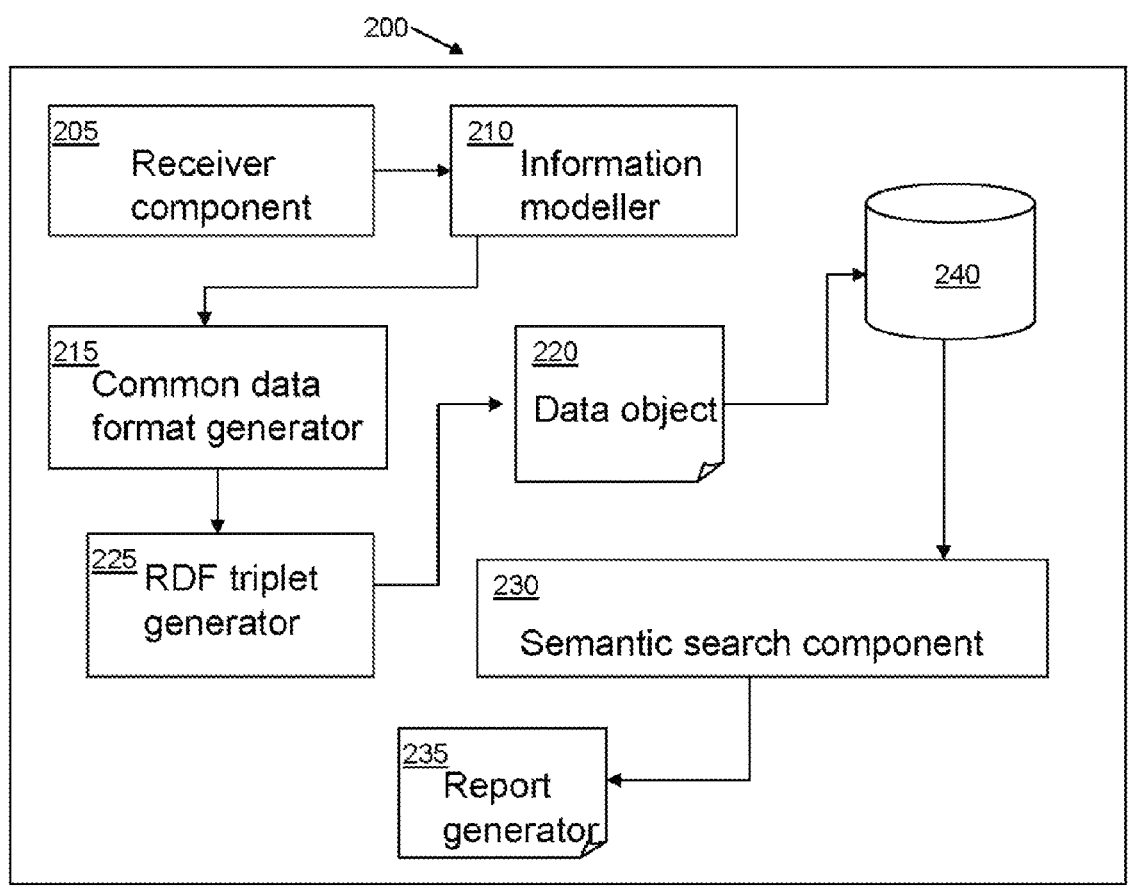
FIG. 2 illustrates a schematic diagram of an exemplary analytics system according to an embodiment of the invention.

Referring to FIG. 2, an exemplary analytics engine 200 may comprise a number of components which interact and cooperate with each other in order to provide the benefits of the disclosure. The analytical engine 200 may include a receiver component 205 for receiving unstructured text from a user or from an external data source such as a solution search application. An information modeler component 210 may be provided for modeling the unstructured text received from the user or external data source in order to extract key data attributes from the unstructured text. The analytics engine 200 may include a common document format generator 215 for formatting the extracted key data attributes into a common document format.

The analytics engine 200 may further comprise a Resource Description Framework (RDF) triple generator 225 for formatting the key data attributes into a RDF triple and outputting data object 220 for storing in a data store 240. A semantic search component 230 may analyze the key attributes of the RDF triple and an associated ontology to identify a data object with key attributes that indicate a solution to the problem definition. The analytics engine 200 may further provide a report generator 235 for displaying results from the problem-solution analysis process. The components of the exemplary analytics engine 200 are now described in detail.

The receiver component 205 may accept either unstructured text from a user in the form of data which defines a problem or a solution, or unstructured text automatically obtained from an external data source such as a problem solving application or a user collaboration system. Data sources may be in the form of Web pages, documents, data feeds, blogs, databases, user forums, emails, shared data repositories, etc. The receiver component 205 may communicate the received text to an information modeler component 210 which models the information into a desired format for further processing. The information modeler component 210 may be in the form of a template comprising a series of questions for extracting key points or aspects about the problem to be solved and may use a text analytics process for analyzing data to extract key points or aspects about the problem or the solution. For example, the input data may comprise the following text concerning a search for an optimal car shape.

"In order to meet EU Directive 123456, it is a requirement that vehicles have low CO2 emissions and consume less fuel. We want to know if we can find an optimum shape of a vehicle that uses less fuel and has a low drag co-efficient".

The information modeler component 210 analyzes the received text and may use a text analytics process to identify key words or attributes from relevant parts of the text. For example, the key words extracted from the paragraph above may include: low CO2 emissions, less fuel, optimum shape and low drag co-efficiency.

The information modeler component 210 may optionally display a list of the extracted key words via a graphical user interface to a user for the user to confirm that these key words correctly define the problem being solved or that they are related to possible solutions to the problem. If the user does not agree with the list of key words, the user may have an option to redefine the problem or suggest different key words. The user may be able to amend, delete or make additions to the key word list via a feedback mechanism. In such a user dialogue, the key word list may be condensed in a manner to facilitate the development of a set of data objects that accurately describes a problem statement.

Data objects may be categorized into two types: data objects that are associated with a problem definition and data objects that are associated with a solution definition. Data objects associated with a problem definition define the type of problems to be solved and data objects associated with a solution definition define the type of possible solutions to a problem.

The information modeler component 210 examines the received text, and in combination with the key words identified by the user, may identify a subject, predicate and object that describe the key aspects about the text. The information modeler component 210 may further represent the problem statement as a resource description format (RDF) triple. For example, consider again the text for the EU Directive example above.

"In order to meet EU Directive 123456, it is a requirement that vehicles have low CO2 emissions and consume less fuel. We want to know if we can find an optimum shape of a vehicle that uses less fuel and low a drag co-efficient".

The text analysis component may determine the subject of the problem statement to be the phrase "optimal shape of a vehicle", the predicate of the problem statement to be the phrase "consume less fuel", and the object of the problem statement to be the phrase "low drag co-efficiency".

Once the information modeler component 210 has identified the subject, predicate, and object relating to the problem, it may pass this information to the common data format generator 215 to format the information into an RDF triple for further processing by the semantic search component 230.

Typically, the subject of an RDF triple is an URI resource identifier. Thus, the subject in the above example would be the location reference of this information i.e., the reference of its storage location, and may be the Web link formed by the concatenation of "www" and ".TR-05/datastore/optimal_shape". The predicate may be the phrase "consume less fuel", and the object may be the phrase "low drag co-efficiency".

Figure 3:
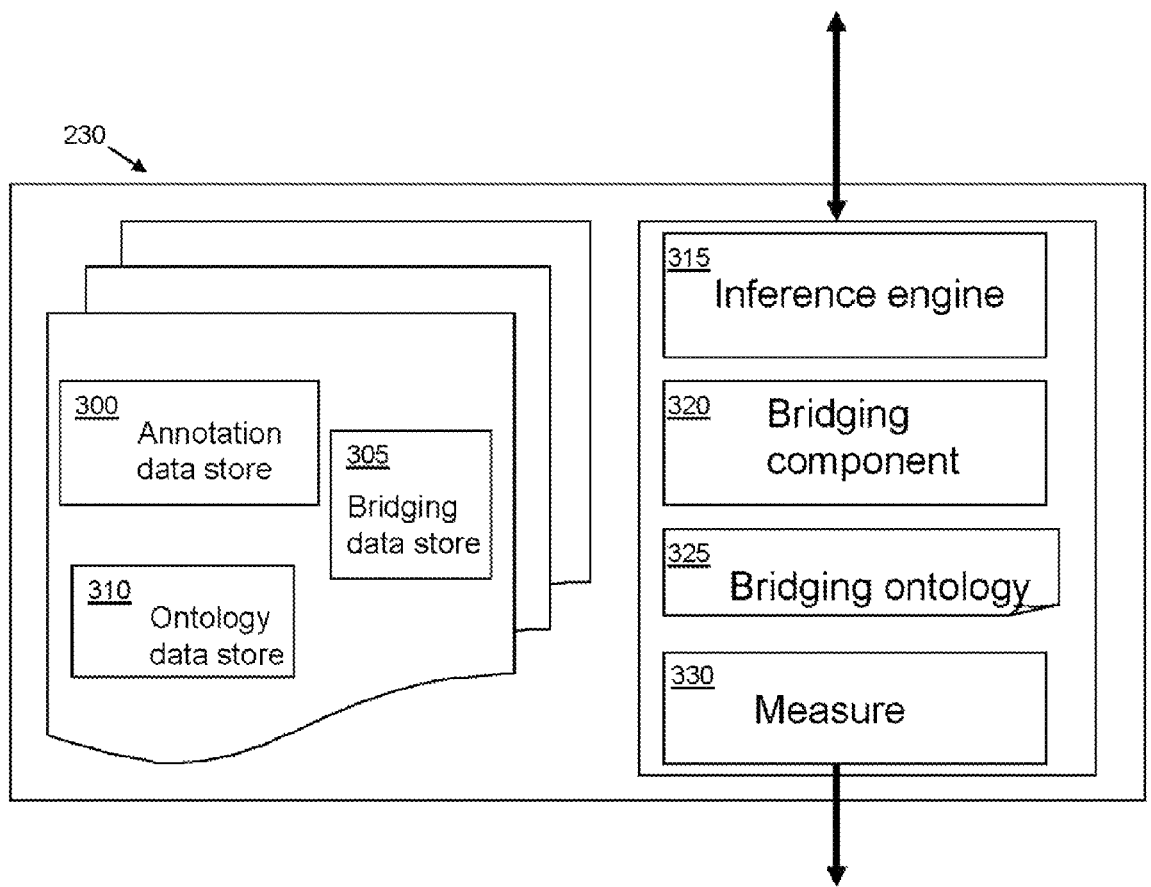
FIG. 3 illustrates a schematic diagram of an exemplary semantic search system, according to an embodiment of the invention.

The analytics engine 200 may communicate the resulting data object that represents the problem statement, which may be in the form of an RDF triple, to a bridging component (as shown in FIG. 3) for associating the RDF triple with a domain specific ontology. The analytics engine 200 may further store the RDF triple in the data object data store 220.

Each domain or discipline is a specific ontology which comprises a dictionary of terms associated with that domain. For example, if the domain is about trees, then the ontology may comprise leaf, bark, branches, root, etc. If the domain is about hierarchical data structures, then the ontology may also comprise trees, branches, leaf nodes, root nodes, etc. An ontology may be represented as a directed graph structure. It may be a pre-existing ontology or constructed by a user when defining data objects. Ontologies may be stored in a data store for further processing. A user may be able to annotate an ontology in order to include additional dictionary terms as needed.

FIG. 3 illustrates an example of the components in a semantic search engine 230. The semantic search engine 230 may have an ontology annotation data store 300 for holding annotations on ontology contents, an ontology data store 310 for holding relevant ontologies, and a bridging data store 305 for holding contents of a bridged ontology 325. The semantic search engine 230 may further include an inference engine 315 for searching the bridged ontology and a bridging component 320 for creating a bridged ontology. It may also comprise a measure component 330 for determining a commonality measure between two ontologies. The components of the semantic search engine 230 are now explained in detail.

Each data object in an ontology may be associated with a problem type or a solution type, and each problem type or solution type is associated with a domain specific ontology. An ontology may comprise a dictionary of terms or words that are specific to that domain or discipline. Each term or word in the ontology may be further annotated to define the word, or to add additional words to the ontology Annotations are processed via the ontology builder component and are stored in the ontology annotation data store 300 with a link to its associated ontology, which is stored in the ontology data store 310. A specific ontology and associated annotations may be modeled and stored as a directed graph structure.

An annotation may be added to the annotation data store 300 at the time the ontology is created or when the information modeler component 210 models the received unstructured problem statement into a key word list. When the analytics engine 200 presents a user with a problem data object that comprises a subject, a predicate and an object, the user may add annotations on the key words related to the data object.

In searching ontologies for data objects that may indicate solutions to a given problem, the inference engine 315 may extract from the ontologies the definitions and attributes of the data objects related to the problem and possible solutions and any relationships among these data objects. The inference engine 315 may further analyze a data object associated with a problem definition and determine the domain associated with the problem data object. For example, if the domain concerns vehicle manufacturing, then the inference engine 315 may search the ontology data store 310 for an ontology related to vehicle manufacturing.

The inference engine 315 may further perform a search in the data store 310 for data objects that are associated with solution definitions. Once these data objects are located, the inference engine 315 may identify the ontologies that relate to the data objects associated with the solution definitions. The inference engine 315 may determine from the solution ontologies those ontologies that are not in the same domain as the ontology of the data object associated with the problem definition.

In one embodiment, the inference engine 315 may determine a dissimilarity measure between the ontology associated with the problem definition and the ontologies associated with the solution definitions. One or more ontologies associated with the solution definitions that have high dissimilarity measures may be marked for further processing. A user may configure a target dissimilarity measure to arrive at a set of ontologies that have no similarity to the ontology associated with the problem definition (in entirely different domains) or an ontology associated with the problem definition (in a similar domain).

The inference engine 315 thus may arrive at a number of candidate secondary ontologies associated with a solution definition for further processing. The bridging component 320 may analyze the ontology associated with the problem definition and compare this ontology (the prime ontology) with one or more of the secondary ontologies associated with the solution definition. One purpose of the bridging component 320 may be to identify a high measure of commonality between the prime ontology and one or more secondary ontologies in order to merge the prime ontology with the secondary ontologies.

The bridging component 320 may use directed graphs that represent the ontologies for determining the commonality between the prime ontology and secondary ontologies. By traversing the ontology graphs, the bridging component 320 may compare a first node in the graph of the prime ontology with a first node of the graph of a second ontology, and determine the word (which generally corresponds to a data element) and a property (or attribute) associated with the first node of the prime ontology. The bridging component 320 may further analyze the graph of the second ontology to determine whether the identified word and its property, i.e., a similar data element and property, are present at a node of the graph of the second ontology.

The bridging component 320 may find an identical word and property in the second ontology, as identified at the first node of the prime ontology. For example, if the word at the first node of the prime ontology is the word 'card' having the property of "object", then the word associated with a node of the second ontology would also be the word "card" having a property of "object" for the bridging component 320 to find a match.

If the bridging component 320 determines that the word associated with a node of the second ontology is not the same word in the first ontology, or the associated property is not the same as the property of the word, then the bridging component 320 examines the words associated with other nodes in the graph. This process continues until the bridging component 320 finds the word "card" and its associated property of "object" associated with a node of the second graph.

If bridging component 320 cannot find the word 'card' and its property in any of the nodes of the graph of the second ontology, then the bridging component 320 may disregard this ontology and analyze another secondary ontology, until a match for the word 'card' and its attribute can be found in the secondary ontologies.

When a match for the word "card" and its associated property is located in a second ontology, the bridging component 320 moves to a second node in the prime ontology and identifies a word and the property associated with the second node. The bridging component 320 then repeats the analysis of the nodes in the second ontology to find a word and property in the second ontology that match the word and property associated with the second node of the prime ontology.

As the bridging component 320 identifies more identical words and associated properties between the prime and secondary ontologies, these words and properties may be written to a temporary data structure for a bridged ontology 325, as described below with reference to FIG. 7. This process continues until all words and associated properties associated with each node in the prime ontology have been examined and compared to the nodes in the secondary ontology.

Figure 4:
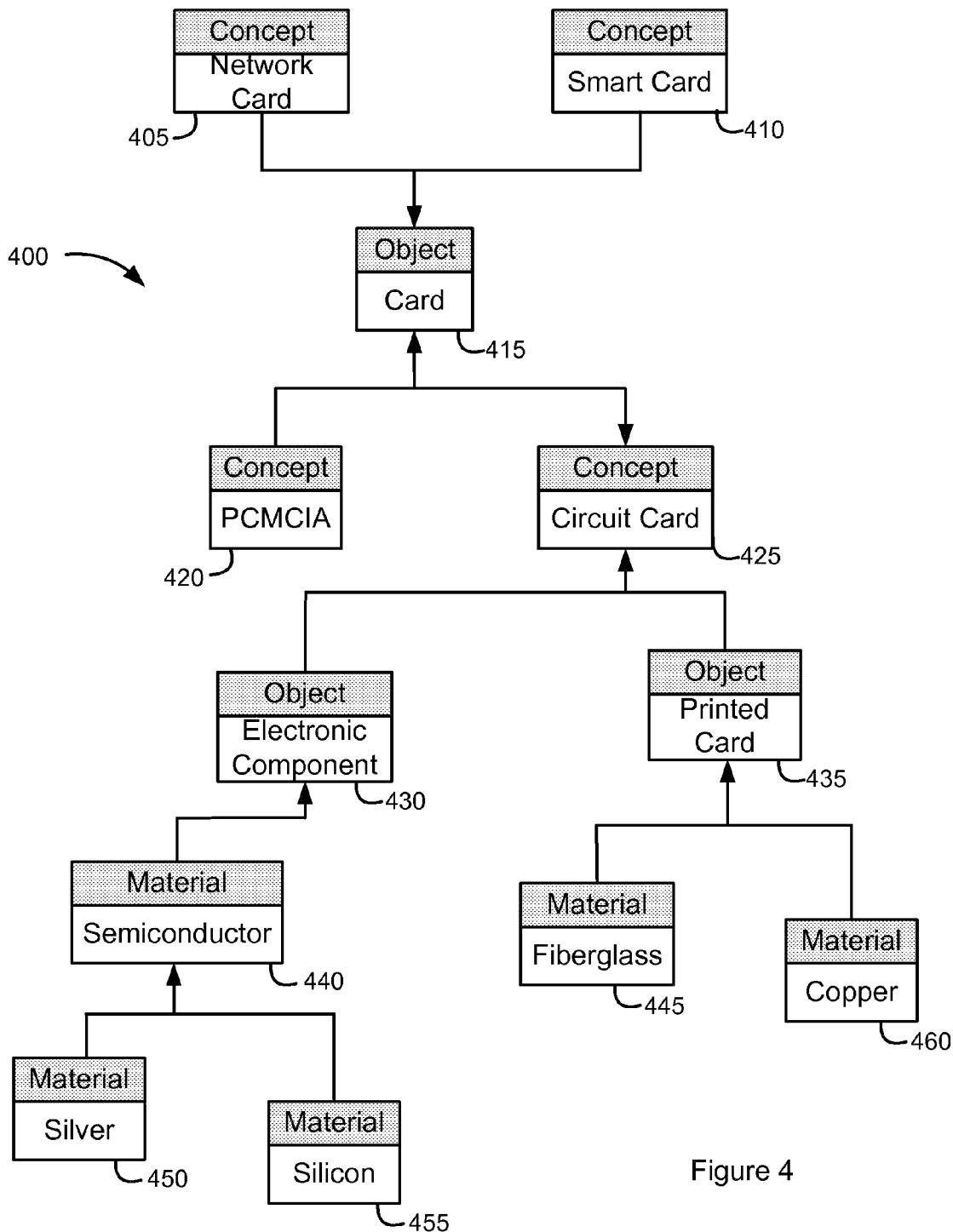
FIG. 4 illustrates a directed graph of an exemplary prime ontology on electronic cards, according to an embodiment of the invention.
Figure 5:
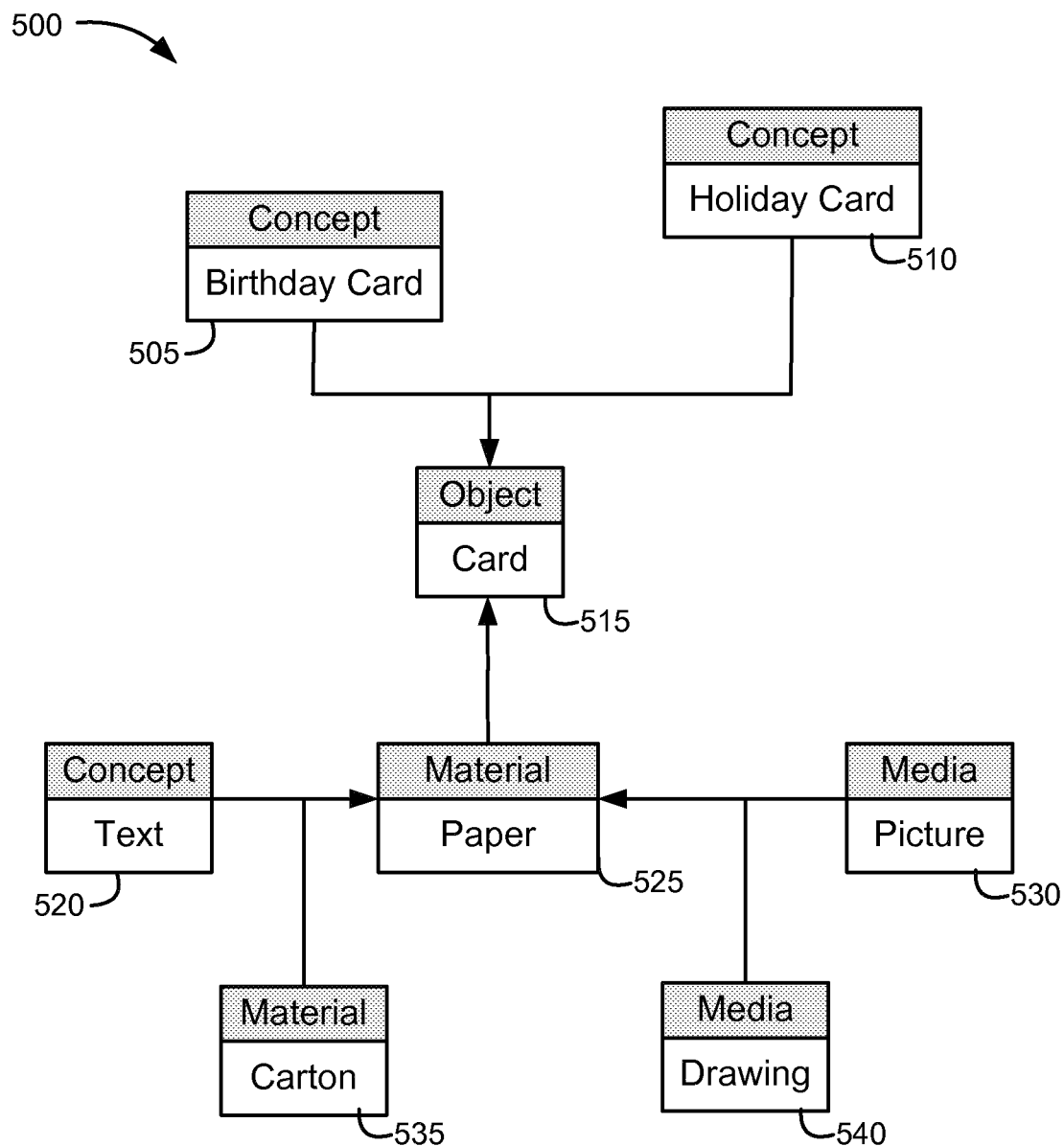
FIG. 5 illustrates a directed graph representing an exemplary secondary ontology on greeting cards, according to an embodiment of the invention.
Figure 6:
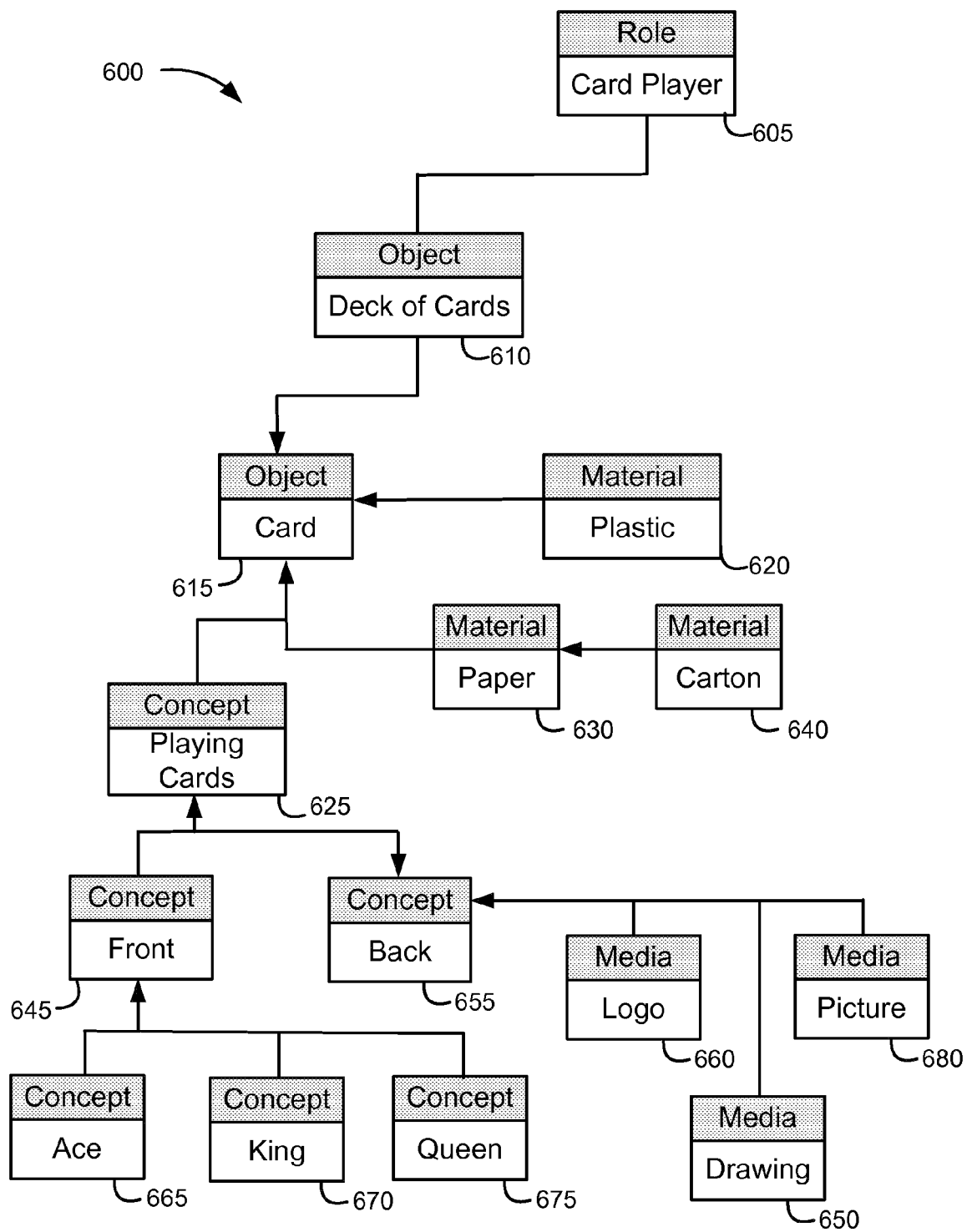
FIG. 6 illustrates a directed graph representing an exemplary secondary ontology on playing cards, according to an embodiment of the invention.

FIGS. 4, 5 and 6 provide further details on an embodiment of the ontology bridging process. As an example, FIG. 4 illustrates an exemplary directed graph structure for the ontology relating to the field of computer science 400. The computer science ontology 400 includes two starting nodes that represent the concepts of "network card" 405 and a "smart card" 410. Both of these concepts are of the type 'card'. A card may be in the form of a "network card" 420 or a "circuit card" 425. A "circuit card" 425 is an electronic component 430 that has a property of "object", and may be categorized as "semiconductor device" 440 that has a property of "material". The "semiconductor device" 440 may be manufactured from materials such as "silver" 450 and "silicon" 455, where "silver" 450 and "silicon" 455 both have the property of "material".

Moving up the ontology graph structure 400 to the "circuit card" 425, the "circuit card" 425 has a property of "concept" and may be a "printed card" 435. "Printed card" 435 has a property of "object" and may be manufactured from "fiber glass" 445 or "copper" 460. Both "fiber glass" 445 and "copper" 460 have the property of "material".

FIG. 5 illustrates an exemplary ontology in the domain of "greeting cards" 500 that includes "birthday card" 505 and "holiday card" 510. Both "cards" 505 and 510 have the property of "concept" and are of the type "card" 515. The type "card" 515 in turn has the property of "object" and is composed of "paper" 525. "Paper" 525 may include "text" 520 which has the property of "concept", and a "picture" 530, which has the property of "media", imposed thereon. "Paper" 525 may be made from "carton" 535, which has the property of "material", and comprise a "drawing" 540 which has the property of "media".

FIG. 6 illustrates an ontology associated with the domain of playing cards 600 and in particular a "card player" 605 who has a property of "role" and uses a deck of "playing cards" 610 having a property of object. Each "card" 615 may be manufactured from "carton" 640, "paper" 630, or "plastic" 620, all of which having a property of "material". The "card" 615 may be a "playing card" 625 that has a property of "concept" and comprises a "front face" 645 (with a property of concept) and a back face 655 (also with a property of concept). The "front face" 645 of the "playing card" 625 comprises an identifier namely, a "king" 670, a "queen" 675 or "ace" 665. The "back face" 655 of the "playing card" 625 comprises a "logo" 660, a "drawing" 650 or a "picture" 680.

As an example of the bridging process, refer again to the greeting cards ontology 500 illustrated in FIG. 5, and in particular, to the sub domain of "holiday cards" 510. In this example, the greeting cards ontology 500 is the prime ontology related to a problem statement that the analytics engine 200 is determining a solution for. The secondary ontologies that the bridging component 320 may use for bridging with the prime ontology 500 are those that have a high measure of commonality relative to the prime ontology 500. The measure of commonality may be the number of common data elements and associated properties between the prime ontology and a secondary ontology. The user may adjust the measure of commonality lower or higher, depending on the results of the inference engine 315, to obtain more or less matching ontologies.

As an example, the analytics engine 200 may examine the computer ontology 400 and playing card ontology 600 as secondary ontologies for possible bridging with the prime ontology 500 (greeting cards). The bridging component 320 may begin by analyzing the first node in the graph structure corresponding to the domain of "holiday cards" 510, which is the data element "card" 515 associated with the property of "object". The bridging component 320 would look for the word "card" and its associated property in a node of a second ontology. Traversing the computer science ontology 400 of FIG. 4, the bridging component 320 searches through each node of a directed graph representing the ontology 400 to locate the word "card" and its property of "object".

As can be seen from FIG. 4, the graph for the computer science ontology 400 includes a node that has the word "card" 415 and the property of "object". The bridging component 320 may use the "card" 415 and property "object" to start building a temporary directed graph that represents a bridged ontology.

The bridging component 320 then continues analyzing the prime ontology 500 and secondary ontology 400 to identify additional identical words and their associated properties. If more matching words and associated properties are found, the bridging component 320 may add them to the temporary directed graph of the bridged ontology. If the bridging component 320 does not identify any other common words and associated properties between the prime ontology 500 (greeting cards) and secondary ontology 400 (computer science), the bridging component 320 may set a commonality measure for the bridging of these ontologies as "1", corresponding to the matching nodes "card". The bridging component 320 may store the bridged ontology in a data store for further processing.

The bridging component 320 may examine other secondary ontologies to continue matching contents of the greeting cards ontology 500 with those of the other secondary ontologies.

In the current example, the next secondary ontology to be analyzed may be an ontology 600 on playing cards, as illustrated in FIG. 6. The bridging component 320 may start by identifying the word "card" and its associated property of "object" in the secondary ontology 600. Once the word "card" and its "object" property are found, the bridging component 320 may look for the word "text" and its associated property of "concept" in the secondary ontology 600. The bridging component 320 continues to compare each node of the prime ontology 500 with each node of the secondary ontology 600 until all the nodes in the two ontologies have been examined and compared.

As identical words and properties are identified, the bridging component 320 may write them to a temporary directed graph structure. Once the bridging component 320 has traversed all the nodes in the prime ontology 500 and secondary ontology 600, it may determine the commonality measure for these ontologies. For the ontologies 500 and 600, the bridging component 320 may assign a commonality measure of "4" based on the four nodes associated with the words "paper", "carton", "drawing", and "picture" that are found in both ontologies.

Figure 7:
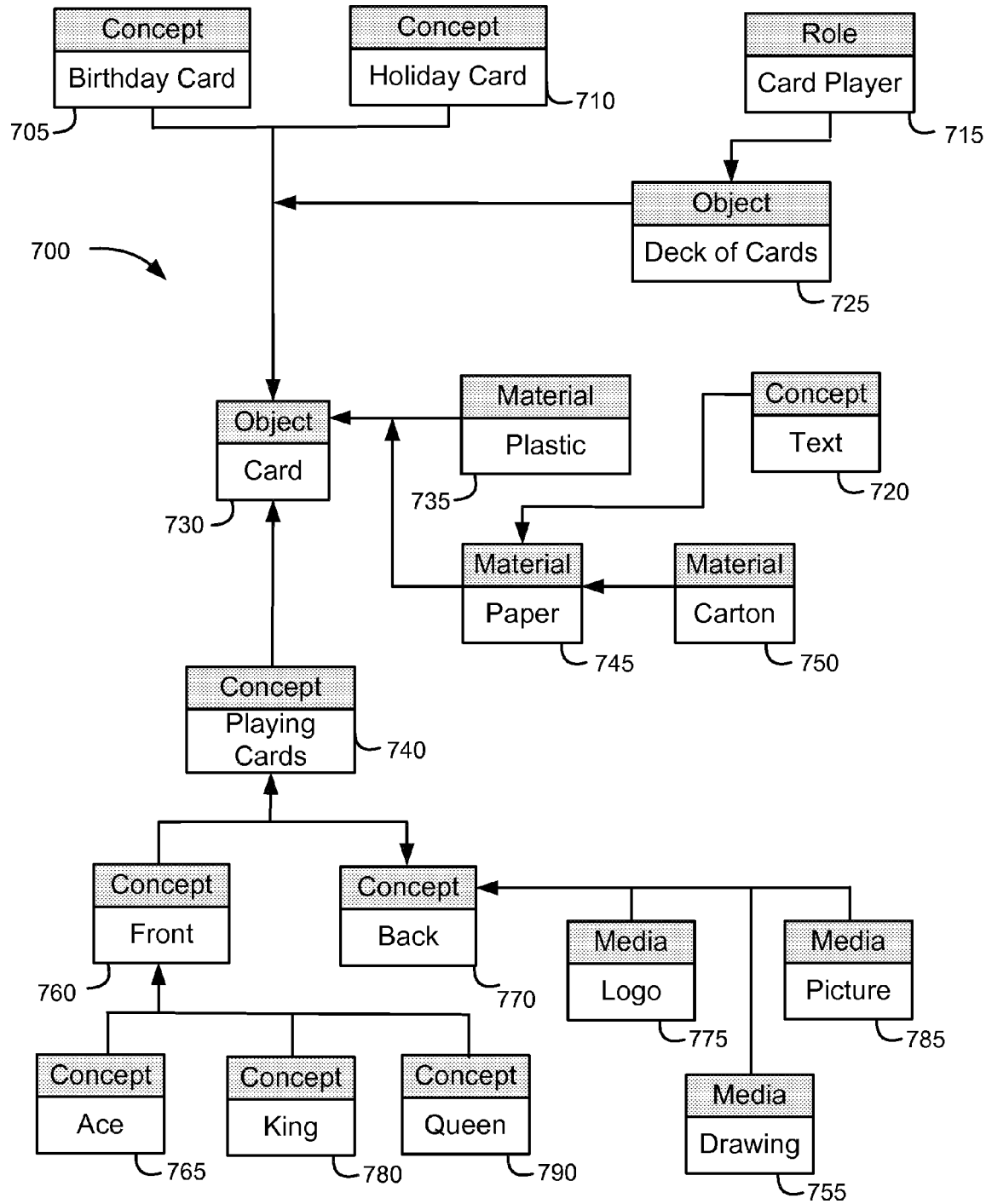
FIG. 7 illustrates a directed graph representing a bridged ontology, according to an embodiment of the invention.

FIG. 7 illustrates an example bridged ontology 700 that results from the bridging operation described above for the ontologies in FIGS. 5 and 6. The directed graph structure that temporarily stored the word and property matches during the bridging operation represents the relationships among the nodes of the bridged ontology 700. The bridging component 320 may next communicate the bridged ontology 700 to the inference engine 315 for further processing. The bridged ontology 700 includes nodes 730, 745, 755 and 785, which are common between the prime ontology 500 and the secondary ontology 600, as well as their other nodes 705, 710, 715, 720, 725, 735, 740, 760, 765, 770, 775, 780 and 790 that are not common between them.

The inference engine 315 may begin the identification of a solution to the problem by analyzing a data object that represents the problem statement. This data object might have previously been generated by the information modeler component 210. The semantic search engine 230 may examine the resource description framework (RDF) triple associated with the problem data object to extract the subject, predicate and object of the problem data object. The inference engine 315 may use the extracted RDF components in combination with the bridged ontology 700 to determine whether the subject, predicate and object of the problem data object have any relationships to the subject, predicate and object of a solution data object. In the present example, the solution data object was found to be in the playing cards ontology based on the identified matching words and properties.

Using the bridged ontology 700, the inference engine 315 may determine relationships between the subject, predicate and object associated with the problem data object and those associated with the solution data object. For example, from the bridged ontology 700 of FIG. 7, the inference engine 315 may infer that it is possible to use a deck of cards as greeting cards, or use the same pictures as displayed on greeting cards for the back sides of the playing cards. The inference engine 315 may output its results to a display component for review and confirmation by the user.

Figure 8:
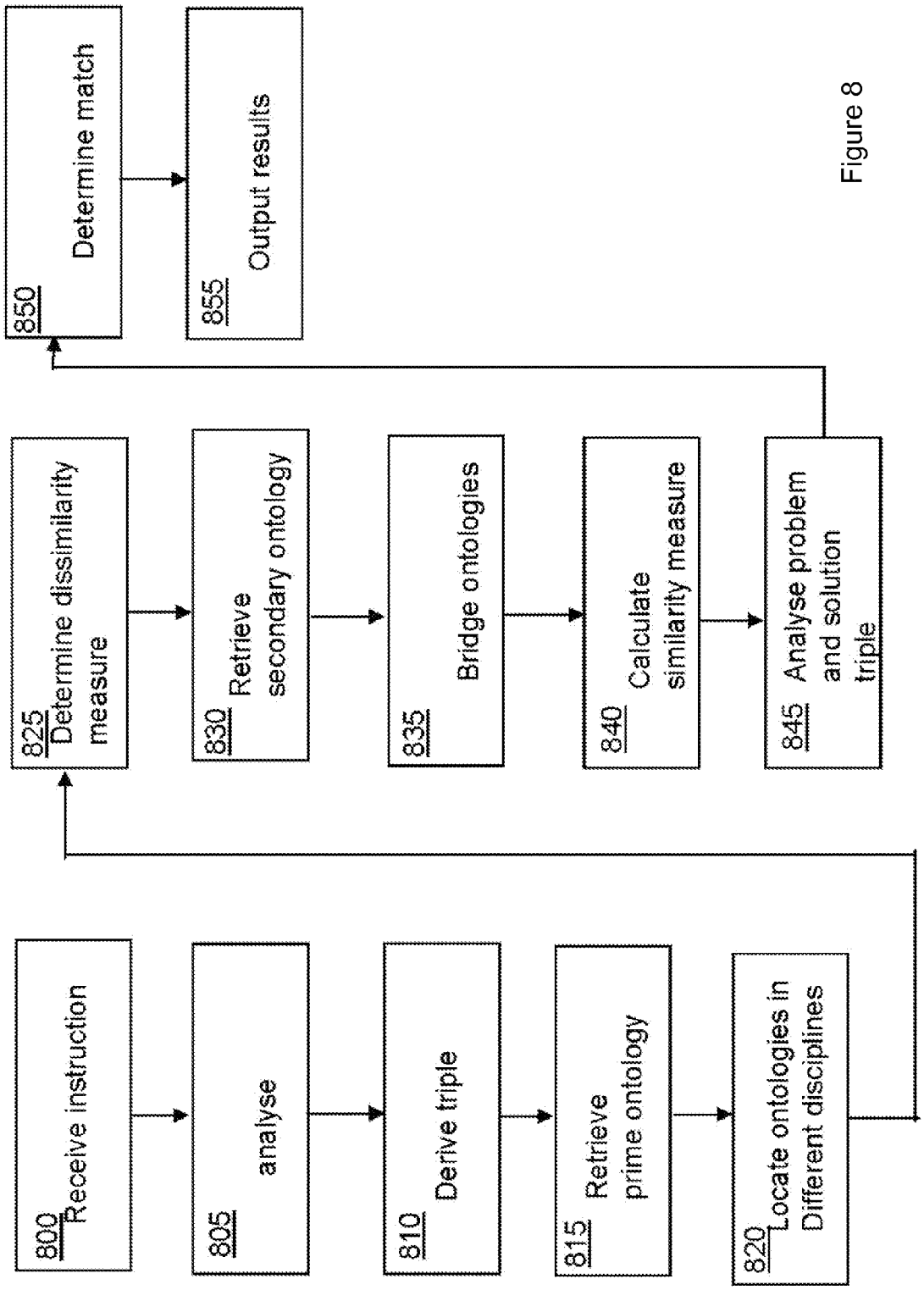
FIG. 8 is a flow chart of an exemplary process for semantic searching, according to an embodiment of the invention.

FIG. 8 illustrates a flow chart of an exemplary process for analyzing a problem statement to determine a possible solution, and presenting the results to a user. The process may begin at step 800 when the receiver component 205 receives the problem statement from the user. The text analytics engine 200 may analyze the problem statement at steps 805 and 810 to generate an RDF triple for the problem in the form of a subject, predicate, and object. At step 815, the inference engine 315 may search an ontology data store to locate an ontology associated with the problem RDF triple, and at step 820, determine a plurality of ontologies to identify those that satisfy a minimum dissimilarity measure determined at step 825.

Based on the ontology search and matching process, the inference engine 315 may return multiple candidate secondary ontologies to be examined further in the ontology bridging process. The bridging component 320 may then analyze each identified secondary ontology and compare this secondary ontology to the prime ontology to determine a commonality indicator. The inference engine 315 may compare each node in the prime ontology to a node in the secondary ontology under consideration to determine whether the word and attribute (or property) associated with the node in the prime ontology are present in the second ontology. A commonality indicator for the prime ontology and secondary ontology may be based on the number of matching words and attributes between these ontologies. A user may establish a target commonality indicator in order to control the accuracy of the ontology matching process. The target commonality indicator could be a minimum number of common words and associated attributes between these ontologies.

Once a secondary ontology with a desired commonality indicator has been identified, a bridged ontology such as ontology 700 may be created which combines the nodes of the prime ontology and the secondary ontology, including the identified common nodes and their relationships, at steps 830, 835 and 840. At step 845, the semantic search component 230 may next search through all the data objects in the bridged ontology to identify at step 850 one or more data objects and relationships associated with the problem and solution statements. For example, in the greeting card scenario above, the semantic search engine 230 may search in the bridged ontology 700 for an object (material) that can be used for a greeting card. The semantic search engine 230 may find a match in the data object 725 that represents a deck of playing cards. The inference engine 315 may present the data object 725, its associated data objects 730, 745 750, their properties and relationships to a user to allow the user to examine these data objects and relationship further and confirm that they relate to a solution being sought for the present problem.

In addition, the inference engine 315 may provide detailed information on the subjects, predicates and objects of the RDF triples associated with the problem and solution data objects, and infer any relationships between these triple components in a form of a report. At step 855, the report generator 235 of the analytics engine 200 may generate a report of possible data object matches, i.e., data objects with associated potential solutions, for display to the user.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

As will be appreciated by one skilled in the art, aspects of the present invention may be embodied as a method, system or computer program product. Accordingly, aspects of the present invention may take the form of entirely hardware, entirely software (including firmware, resident software, micro-code, etc.) or a combination of software and hardware aspects that may all generally be referred to herein as a "circuit" or "module." Furthermore, aspects of the present invention may take the form of a computer program product embodied in one or more computer readable medium(s) having computer readable program code 114 (see FIG. 1) embodied thereon.

Any combination of one or more computer readable medium(s) may be utilized. The computer readable medium may be a computer readable signal medium or a computer readable storage medium. A computer readable storage medium may be, for example, an electronic, or semiconductor system, apparatus, or device. More specific examples of the computer readable storage medium would include the following: a portable computer diskette, a hard disk, a random access memory (RAM), a read-only memory (ROM), an erasable programmable read-only memory (EPROM or Flash memory), and a portable compact disc read-only memory (CD-ROM). Each of the terms "computer readable storage medium" and "computer-readable storage device" does not mean signal.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code 114 (see FIG. 1) for carrying out operations for aspects of the present invention may be written in any combination of one or more programming languages, including an object oriented programming language such as Java, Smalltalk, C++ or the like and conventional procedural programming languages, such as the "C" programming language or similar programming languages. Java is a registered trademark of Oracle and/or its affiliates. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), Ethernet, or the connection may be made to an external computer, for example, through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium 102, 103 or 104 (see FIG. 1) that can direct a computer 100 (see FIG. 1), other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described above illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer system comprising:
a central processing unit (CPU);
a memory coupled to the CPU; and
a computer-readable storage device coupled to the CPU, the storage device containing instructions that are executed by the CPU via the memory to implement a method of identifying a solution to a problem, the problem and solution being in different first and second disciplines respectively represented by first and second ontologies, the method comprising the steps of:
  in response to a determination that the first ontology represents the first discipline of the problem, the computer system retrieving the first ontology from a plurality of ontologies stored in a data store;
  the computer system selecting the second ontology and a third ontology from the plurality of ontologies;
  based on the second ontology being selected and in response to traversals of first and second directed graphs representing the first and second ontologies, respectively, the computer system determining a first number of first data elements in common between the first directed graph and the second directed graph, the first data elements in common being data elements in the first directed graph whose words and properties are identical to respective words and properties in data elements in the second directed graph;
  based on the third ontology being selected and in response to traversals of a third directed graph representing the third ontology and the first directed graph, the computer system determining a second number of second data elements in common between the first directed graph and the third directed graph, the second data elements in common being data elements in the first directed graph whose words and properties are identical to respective words and properties in data elements in the third directed graph;
  the computer system determining the first number of first data elements exceeds a threshold value and determining the second number of second data elements does not exceed the threshold value;

based on the first number of the first data elements in common between the first directed graph and the second directed graph exceeding the threshold value, and the second number of the second data elements in common between the first directed graph and the third directed graph not exceeding the threshold value, the computer system generating a bridged ontology that merges the first and second ontologies, but does not merge the first and third ontologies, the computer system extracting a subject, predicate, and object of the problem from a first data object which specifies the problem, the first data object based on a determination of key words in a statement of the problem;

the computer system identifying a relationship between the extracted subject, predicate, and object and, respectively, a subject, predicate, and object of a second data object included in the bridged ontology; and based on the identified relationship between the subject, predicate, and object extracted from the first data object which specifies the problem and, respectively, the subject, predicate, and object of the second data object included in the bridged ontology, the computer system identifying the solution to the problem as being the second data object.

2. The computer system of claim 1, wherein the method further comprises the steps of:

the computer system determining a first measure of dissimilarity between the first and second ontologies;

the computer system determining a second measure of dissimilarity between the first and third ontologies; and the computer system determining the first and second measures of dissimilarity exceed a minimum measure of dissimilarity, wherein the step of selecting the second and third ontologies from the plurality of ontologies is based on the first and second measures of dissimilarity exceeding the minimum measure of dissimilarity.

3. The computer system of claim 2, wherein the step of generating the bridged ontology is based in part on the first measure of dissimilarity exceeding the minimum measure of dissimilarity.

4. The computer system of claim 1, wherein the method further comprises the steps of:

the computer system determining the key words in the statement of the problem;

based on the key words, the computer system generating the first data object specifying the problem; and based on the first data object which specifies the problem, the computer system determining the first discipline of the problem.

5. The computer system of claim 1, wherein the method further comprises the step of the computer system determining the second data object includes the first data elements in common between the first and second directed graphs, wherein the step of identifying the solution to the problem as being the second data object is further based on the second data object including the first data elements in common between the first and second directed graphs.

6. The computer system of claim 1, wherein the method further comprises the steps of:

the computer system determining a plurality of data objects in the bridged ontology as potential solutions to the problem, the data objects consisting of respective subjects, predicates and objects;

the computer system identifying relationships between the subject, predicate, and object extracted from the first data object which specifies the problem and the respective subjects, predicates, and objects of which the data objects consist, wherein the step of identifying the relationships includes the step of identifying the relationship between the extracted subject, predicate, and object and the subject, predicate, and object of the second data object;

the computer system presenting a report including the identified relationships; and in response to a review by a user of the relationships in the report, the computer system receiving from the user a confirmation that the identified relationship between the extracted subject, predicate, and object and the subject, predicate, and object of the second data object indicates the second data object is the solution to the problem.

7. The computer system of claim 1, wherein the step of identifying the relationship includes:

determining a word and a property of a data element including the subject of the first data object are identical to a word and a property of a data element including the subject of the second data object;

determining a word and a property of a data element including the predicate of the first data object are identical to a word and a property of a data element including the predicate of the second data object; and determining a word and a property of a data element including the object of the first data object are identical to a word and a property of a data element including the object of the second data object.

8. A method for identifying a solution to a problem, the problem and solution being in different first and second disciplines respectively represented by first and second ontologies, the method comprising the steps of:

in response to a determination that the first ontology represents the first discipline of the problem, a computer retrieving the first ontology from a plurality of ontologies stored in a data store;

the computer selecting the second ontology and a third ontology from the plurality of ontologies;

based on the second ontology being selected and in response to traversals of the first and second directed graphs representing the first and second ontologies, respectively, the computer determining a first number of first data elements in common between the first directed graph and the second directed graph, the first data elements in common being data elements in the first directed graph whose words and properties are identical to respective words and properties in data elements in the second directed graph;

based on the third ontology being selected and in response to a traversal of the first directed graph and a traversal of a third directed graph representing the third ontology, the computer determining a second number of second data elements in common between the first directed graph and the third directed graph, the second data elements in common being data elements in the first directed graph whose words and properties are identical to respective words and properties in data elements in the third directed graph;

the computer determining the first number of first data elements exceeds a threshold value and determining the second number of second data elements does not exceed the threshold value;

based on the first number of the first data elements in common between the first directed graph and the second directed graph exceeding the threshold value, and the second number of the second data elements in common between the first directed graph and the third directed graph not exceeding the threshold value, the computer generating a bridged ontology that merges the first and second ontologies, but does not merge the first and third ontologies;

the computer extracting a subject, predicate, and object of the problem from a first data object which specifies the problem, the first data object based on a determination of key words in a statement of the problem;

the computer identifying a relationship between the extracted subject, predicate, and object and, respectively, a subject, predicate, and object of a second data object included in the bridged ontology; and based on the identified relationship between the subject, predicate, and object extracted from the first data object which specifies the problem and, respectively, the subject, predicate, and object of the second data object included in the bridged ontology, the computer identifying the solution to the problem as being the second data object.

9. The method of claim 8, further comprising the steps of:
the computer determining a first measure of dissimilarity between the first and second ontologies;
the computer determining a second measure of dissimilarity between the first and third ontologies; and
the computer determining the first and second measures of dissimilarity exceed a minimum measure of dissimilarity, wherein the step of selecting the second and third ontologies from the plurality of ontologies is based on the first and second measures of dissimilarity exceeding the minimum measure of dissimilarity.

10. The method of claim 9, wherein the step of generating the bridged ontology is based in part on the first measure of dissimilarity exceeding the minimum measure of dissimilarity.

11. The method of claim 8, further comprising the steps of:
the computer determining the key words in the statement of the problem;
based on the key words, the computer generating the first data object specifying the problem; and
based on the first data object which specifies the problem, the computer determining the first discipline of the problem.

12. The method of claim 8, further comprising the step of the computer determining the second data object includes the first data elements in common between the first and second directed graphs, wherein the step of identifying the solution to the problem as being the second data object is further based on the second data object including the first data elements in common between the first and second directed graphs.

13. The method of claim 8, further comprising the steps of:
the computer determining a plurality of data objects in the bridged ontology as potential solutions to the problem, the data objects consisting of respective subjects, predicates and objects;
the computer identifying relationships between the subject, predicate, and object extracted from the first data object which specifies the problem and the respective subjects, predicates, and objects of which the data objects consist, wherein the step of identifying the relationships includes the step of identifying the relationship between the extracted subject, predicate, and object and the subject, predicate, and object of the second data object;

the computer presenting a report including the identified relationships; and in response to a review by a user of the relationships in the report, the computer receiving from the user a confirmation that the identified relationship between the extracted subject, predicate, and object and the subject, predicate, and object of the second data object indicates the second data object is the solution to the problem.

14. The method of claim 8, wherein the step of identifying the relationship includes:
determining a word and a property of a data element including the subject of the first data object are identical to a word and a property of a data element including the subject of the second data object;
determining a word and a property of a data element including the predicate of the first data object are identical to a word and a property of a data element including the predicate of the second data object; and
determining a word and a property of a data element including the object of the first data object are identical to a word and a property of a data element including the object of the second data object.

15. A computer program product comprising:
a computer-readable storage medium; and
a computer-readable program code stored in the computer-readable storage medium, the computer-readable program code containing instructions that are executed by a central processing unit (CPU) of a computer system to implement a method of identifying a solution to a problem, the problem and solution being in different first and second disciplines respectively represented by first and second ontologies, the method comprising the steps of:
in response to a determination that the first ontology represents the first discipline of the problem, the computer system retrieving the first ontology from a plurality of ontologies stored in a data store;
the computer system selecting the second ontology and a third ontology from the plurality of ontologies;
based on the second ontology being selected and in response to traversals of first and second directed graphs representing the first and second ontologies, respectively, the computer system determining a first number of first data elements in common between the first directed graph and the second directed graph, the first data elements in common being data elements in the first directed graph whose words and properties are identical to respective words and properties in data elements in the second directed graph;
based on the third ontology being selected and in response to traversals of a third directed graph representing the third ontology and the first directed graph, the computer system determining a second number of second data elements in common between the first directed graph and the third directed graph, the second data elements in common being data elements in the first directed graph whose words and properties are identical to respective words and properties in data elements in the third directed graph;
the computer system determining the first number of first data elements exceeds a threshold value and determining the second number of second data elements does not exceed the threshold value;
based on the first number of the first data elements in common between the first directed graph and the second directed graph exceeding the threshold value, and the second number of the second data elements in common between the first directed graph and the third directed graph not exceeding the threshold value, the computer system generating a bridged ontology that merges the first and second ontologies, but does not merge the first and third ontologies, the computer system extracting a subject, predicate, and object of the problem from a first data object which specifies the problem, the first data object based on a determination of key words in a statement of the problem;

the computer system identifying a relationship between the extracted subject, predicate, and object and, respectively, a subject, predicate, and object of a second data object included in the bridged ontology; and based on the identified relationship between the subject, predicate, and object extracted from the first data object which specifies the problem and, respectively, the subject, predicate, and object of the second data object included in the bridged ontology, the computer system identifying the solution to the problem as being the second data object.

16. The computer program product of claim 15, wherein the method further comprises the steps of:

the computer system determining a first measure of dissimilarity between the first and second ontologies;

the computer system determining a second measure of dissimilarity between the first and third ontologies; and the computer system determining the first and second measures of dissimilarity exceed a minimum measure of dissimilarity, wherein the step of selecting the second and third ontologies from the plurality of ontologies is based on the first and second measures of dissimilarity exceeding the minimum measure of dissimilarity.

17. The computer program product of claim 16, wherein the step of generating the bridged ontology is based in part on the first measure of dissimilarity exceeding the minimum measure of dissimilarity.

18. The computer program product of claim 15, wherein the method further comprises the steps of:

the computer system determining the key words in the statement of the problem;

based on the key words, the computer system generating the first data object specifying the problem; and based on the first data object which specifies the problem, the computer system determining the first discipline of the problem.

19. The computer program product of claim 15, wherein the method further comprises the step of the computer system determining the second data object includes the first data elements in common between the first and second directed graphs, wherein the step of identifying the solution to the problem as being the second data object is further based on the second data object including the first data elements in common between the first and second directed graphs.

20. The computer program product of claim 15, wherein the method further comprises the steps of:

the computer system determining a plurality of data objects in the bridged ontology as potential solutions to the problem, the data objects consisting of respective subjects, predicates and objects;

the computer system identifying relationships between the subject, predicate, and object extracted from the first data object which specifies the problem and the respective subjects, predicates, and objects of which the data objects consist, wherein the step of identifying the relationships includes the step of identifying the relationship between the extracted subject, predicate, and object and the subject, predicate, and object of the second data object;

the computer system presenting a report including the identified relationships; and in response to a review by a user of the relationships in the report, the computer system receiving from the user a confirmation that the identified relationship between the extracted subject, predicate, and object and the subject, predicate, and object of the second data object indicates the second data object is the solution to the problem.

* * * * *